United States Patent [19]
Goker et al.

[11] Patent Number: 6,031,681
[45] Date of Patent: Feb. 29, 2000

[54] METHOD AND ARRANGEMENT FOR SERVOING AND FORMATTING MAGNETIC RECORDING TAPE

[75] Inventors: Turguy Goker, Solana Beach; William Buchan, Corona Del Mar, both of Calif.

[73] Assignee: Seagate Technology, Inc., Scotts Valley, Calif.

[21] Appl. No.: 09/071,696

[22] Filed: May 1, 1998

Related U.S. Application Data

[62] Division of application No. 08/557,772, Nov. 13, 1995, Pat. No. 5,796,537.

[51] Int. Cl.[7] .................................................. G11B 21/02
[52] U.S. Cl. ................... 360/75; 360/64; 360/70
[58] Field of Search .................. 360/64, 75, 70, 360/84, 85, 53, 76, 51

[56] References Cited

FOREIGN PATENT DOCUMENTS

WO 93/26005  12/1993  WIPO .

*Primary Examiner*—Andrew L. Sniezek
*Attorney, Agent, or Firm*—McDermott, Will & Emery

[57] ABSTRACT

In an arcuate scanner, a read head senses passage over a reference stripe recorded on a moving recording tape. Detection and logic circuitry respond to the read head signal to detect the reference stripe and determine an angular position of the read head with respect to an index associated with the arcuate scanner head assembly. Timing operations of the arcuate scanner and alignment of the arcuate scanner head assembly with regard to an information recording region on the tape are controlled in reference to the detection of the reference stripe.

14 Claims, 7 Drawing Sheets

Figure 1
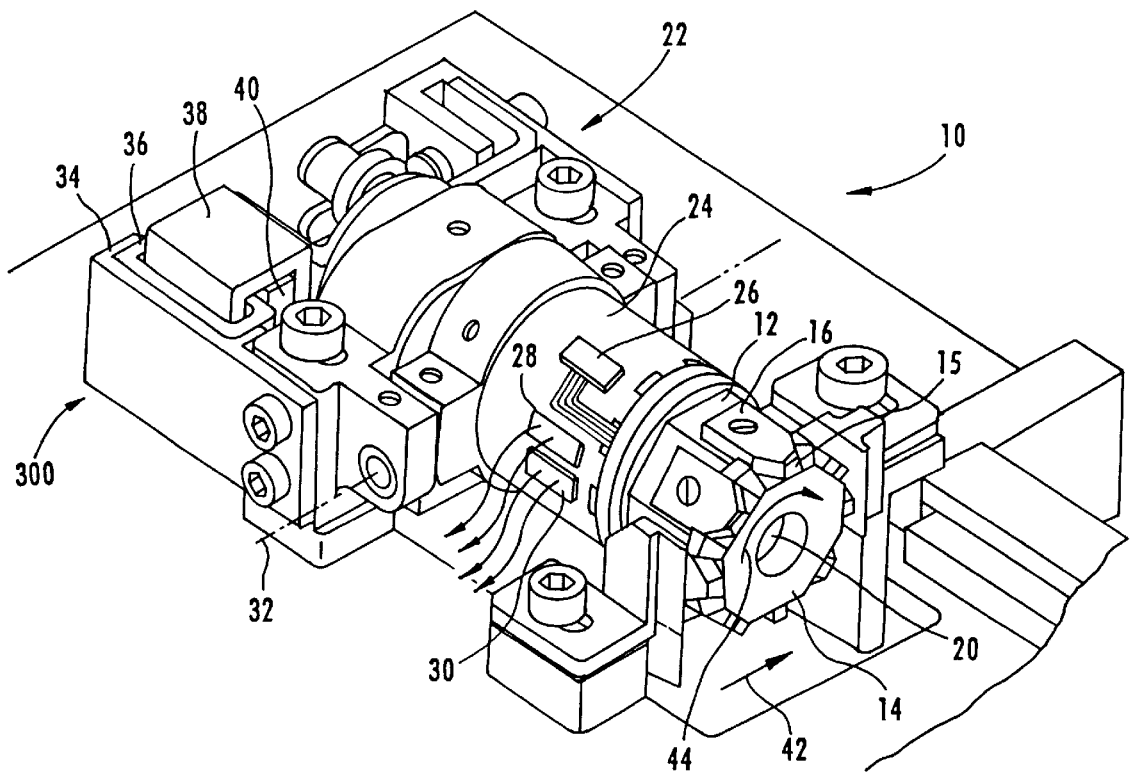
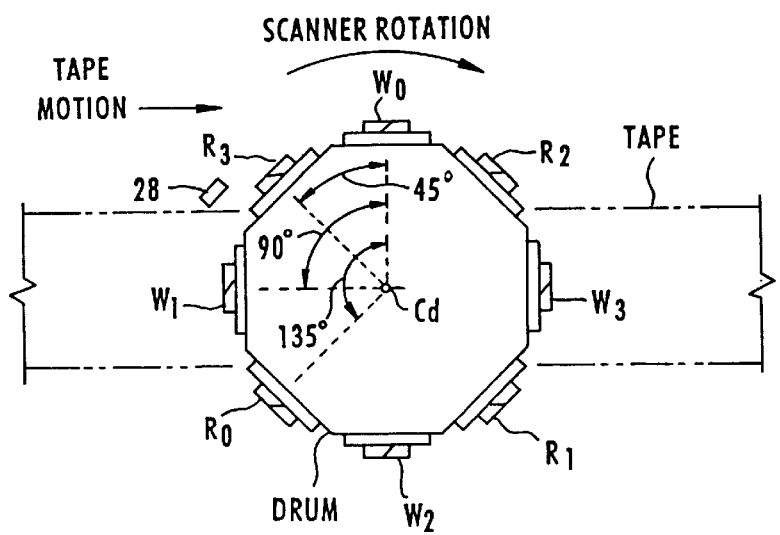
Figure 2

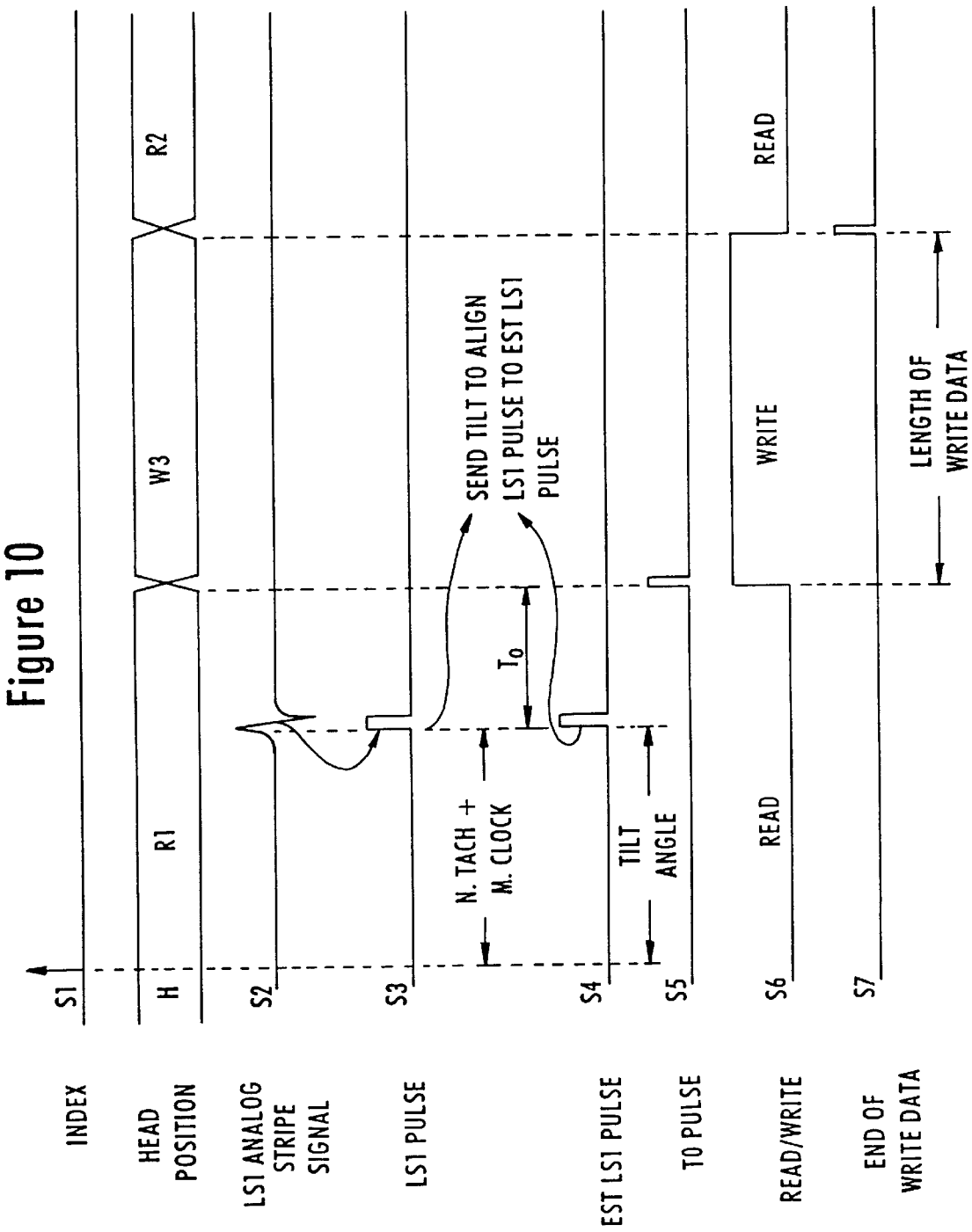

METHOD AND ARRANGEMENT FOR SERVOING AND FORMATTING MAGNETIC RECORDING TAPE

This application is a divisional of application Ser. No. 08/557,772 filed Nov. 13, 1995 now U.S. Pat. No. 5,796,537.

FIELD OF THE INVENTION

The present invention relates to tape drives having an arcuate scanner, and more particularly to servo control of the scanner heads based on a reference point in the tape format to accurately control the operation of writing data to the tape and the operation of reading data from the tape.

DESCRIPTION OF RELATED ART

Conventional magnetic tape drive systems provide a reel-to-reel transport of magnetic tape past a fixed recording/reading location where a stationary singletrack or multiple-track head is positioned. Recording and playback are performed longitudinally with respect to the tape by moving the tape on its longitudinal axis past the stationary record/playback head mechanism. In the stationary head tape drive, a plurality of transversely-aligned heads are fixedly positioned with respect to the tape during recording and playback. The recording heads place a plurality of parallel longitudinally-extending tracks on the tape.

Rotary head tape drive systems provide higher capacity. In such systems, magnetic head mechanisms rotate relative to the moving storage tape. The most common rotary head system, first developed for video recording, utilizes a helical scan. The tape wraps around a drum tilted at an angle with regard to the direction of motion of the tape. The drum supports two or more heads. The combination of tape motion and drum rotation produces straight tracks recorded at an angle with respect to the length (longitudinal axis) of the tape.

The application of helical scanning to data storage systems has been limited. Helical scanning requires high-pressure contact between the tape and the drum. Repeated motion of the tape across the drum for large numbers of read and/or write operations for common computer data storage and retrieval purposes causes wear on the head parts and the tapes. Also, the helical scanning mechanism tends to be large; complex and expensive.

Another known type of rotary scanning technology, however, is arcuate scan technology. In arcuate scanning, read and write scanner heads are mounted near the periphery of a circular planar surface and rotated thereon about an axis passing through the center of the circular surface and through the plane of a longitudinally-moving tape. In writing data on a tape, arcuate scanners produce a sequence of arcuately-shaped tracks which are transverse to the longitudinal axis of the tape.

Examples of arcuate scanning tape drives are described, for example, in: U.S. Pat. No. 2,750,449; U.S. Pat. No. 2,924,668; U.S. Pat. No. 3,320,371; U.S. Pat. No. 4,636,886; U.S. Pat. No. 4,647,993; and U.S. Pat. No. 4,731,681.

International Application WO 93/26005 to Lemke et al. discloses an example of an arcuate scanning tape drive for computer data storage, and the disclosure thereof is expressly incorporated herein entirely by reference. In the Lemke et al. arcuate scanning tape drive, a number of scanner heads are provided around the periphery of the circular planar surface. As the scanner rotates and the tape moves past the rotating scanner surface, the read and write heads alternately pass over the tape. The operation of the scanner is commutated or switched from "write" to "read" to alternatively activate the appropriate operation through alternate ones of the scanner heads.

To effectively read and write data in arcuate tracks on a longitudinally moving tape requires (1) writing the tracks in an agreed format, position and alignment on the tape, and (2) corresponding positioning and alignment of the read heads during the read operation to locate and recover the data written on the tracks. In an arcuate scanner of the type described, there are a number of variables which effect both the read operation and the write operation. These include tape speed, rotational speed of the scanner head and orientation of the scanner head with respect to the tape. Several of these variables are effected by external factors. For example, if there is some vibration of a scanner during the writing operation, it may be difficult to align the head with the data tracks during a read operation, particularly if the read operation is performed by a different scanner.

The timing of the commutation is critical, so that the read and write heads are properly positioned over the tape when performing their read and write operations. Variations in timing of the write operation cause variations in the placement of the arcuate data tracks on the tape. If a drive reading the tape cannot detect and compensate for such variations, that drive may not recover all of the data from all of the tracks.

In order to properly commutate between the read/write operations of the scanner, and time these read/write operations, it is necessary to accurately determine the rotational position of the various scanner heads relative to a stationary (non-rotating) point. This stationary point (i.e. "rotational point") may be a scanner tachometer or tachometer index that the scanner heads pass as the scanner rotates. The position of the various heads relative to the scanner tachometer or tachometer index is used to time the various heads.

In arcuate scanning, it also is necessary to stay on track for recording; and on replay, it is necessary to match the pointing of the reading scanner with the pointing of the scanner that wrote the information on the tape. The reading and writing operations therefore are critically affected by the proper angular positioning of the rotating scanner head assembly with respect to the tape. Misalignment often prevents accurate recovery of stored data.

SUMMARY OF THE INVENTION

The present invention overcomes the above noted problems regarding arcuate scanning and provides an enhancement in high-density storage of computer data on tape by referencing various operations of the scanner head assembly to a reference point on the readable recording tape.

More specifically, the present invention relates to a technique for controlling the operations of a multiple head arcuate scanner. The arcuate scanner head assembly rotates about an assembly axis. The arcuate scanner head assembly includes at least two heads radially mounted on the assembly with a predetermined angle therebetween. A first one of the heads is a read head. The recording tape moves longitudinally and across the assembly axis. The recording tape has a readable stripe extending along the length of the recording tape at a predetermined lateral position on the recording tape. In response to a signal from a first head, a circuit detects passage of the first head across the readable stripe. Subsequently, one or more operations of the scanner are controlled in response to the detection of the passage over the stripe.

In one aspect of the invention, a transit delay time of a second one of the heads is calculated. The time delay corresponds to the time for the second head to transit from its angular position at the time when the first head crosses the readable stripe to a predetermined position in relation to the tape. Operation via the second head, for example a write operation or sampling of signals from a read head to detect a predetermined type of data, is activated after expiration of the delay time.

In one embodiment, the delay follows the actual detection of passage of the first head across the readable stripe. In a second embodiment, the delay follows an estimated passage of the first head across the readable stripe.

In another aspect, the invention relates to control of the angular orientation of the arcuate scanner head assembly, and thus the alignment of the assembly with regard to the moving tape, in response to the detection of the passage of the first head over the stripe. More specifically, an angular relationship of the first head with respect to a rotational index is determined when the head crosses the readable stripe. A control loop activates a tilt control motor to adjust the tilt angle of the arcuate scanner head assembly in response to the angular relationship of the first head with respect to the index.

The foregoing and other features, aspects and advantages of the present invention will become more apparent from the following detailed description of the present invention when taken in conjunction with the accompanying drawings.

BRIEF DESCRIPTION OF THE DRAWINGS

FIG. 1 is a diagram of an arcuate scanner of a tape drive, operating in accordance with an embodiment of the present invention.

FIG. 2 is front view of the arcuate scanner head assembly, of the scanner of FIG. 1, showing the angular relationship of the read and write heads and the passage of a tape past the head assembly.

FIG. 10 is a timing diagram helpful in understanding operation of the system when controlled in the manner illustrated in FIG. 9.

DETAILED DESCRIPTION OF THE ILLUSTRATIVE EMBODIMENTS

Figure 3:
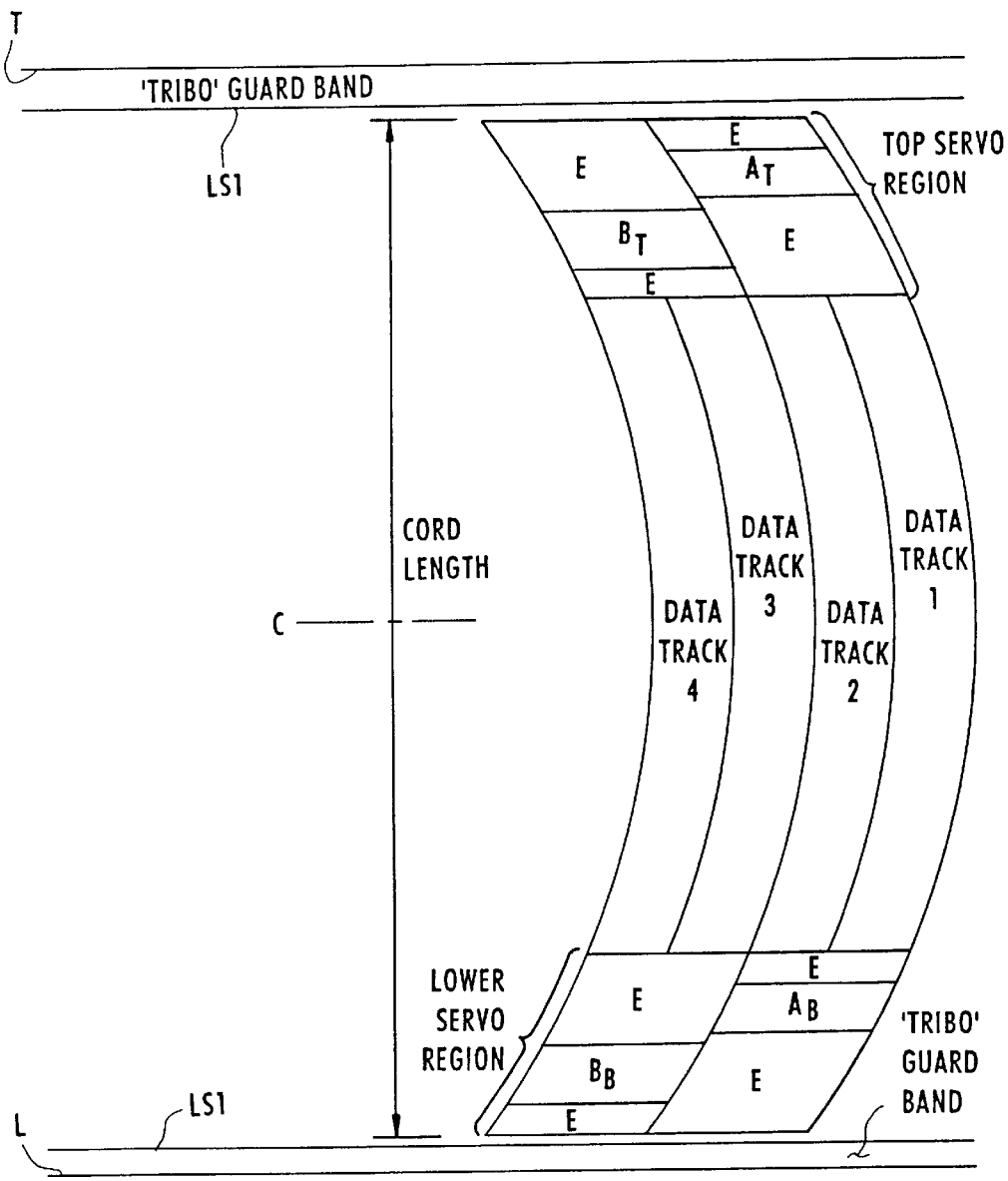
FIG. 3 is a diagram of the format of information recorded on the tape, when viewed through the tape toward the planar surface end of the arcuate scanner head assembly in FIG. 2.

FIG. 1 depicts a perspective view of an arcuate scanner head assembly (ASHA) 10 which writes and reads a sequence of arcuate tracks on a recording tape. The scanner 10 has a drum 12 with an end face 14 at which a plurality of read and write transducers are mounted on support blocks 16. A magnetic transducer 15 is mounted at the forward tip of each support block 16. The drum 12 is rotated by a rotatable shaft 20 which is mounted for rotation in a motor/bearing assembly, generally indicated by reference numeral 22. Electrical signals are transferred to and from the transducers on the drum 12 by a conventional rotary transformer assembly having a rotary piece and a stator piece (not visible in the illustrated view). The drum 12 (with the rotor) is fixed to rotate with the shaft 20. The housing 24 and stator are stationary with respect to the shaft 20. As the shaft 20 rotates together with the rotor and drum 12, electrical signals are written to and read from arcuate tracks on the recording tape by a signal path which includes the electromagnetic flux couplings between the rotor and stator. The housing 24 is essentially cylindrical and encloses the structure providing rotational power to the shaft 20.

The windings of the stator connect to wiring pads, one of which is shown as reference numeral 26 on the outer surface of the motor/bearing housing 24. The wiring pads 26 provide electrical connection through wiring to circuit elements.

Sensors 28 and 30 are also mounted to the housing 24 and provide, respectively, an index signal and a shaft rotational speed signal for each full rotation of the shaft 20.

Two different types of angles are critical to proper reading and writing operations in arcuate scanners are discussed herein. The first type of angle relates to various rotational angles, i.e. of the various scanner heads, about the central axis of the arcuate scanner head assembly. Commutation functions are controlled as a function of the rotational angle relative to the index. The other critical angle is the tilt angle of the arcuate scanner head assembly. The tilt angle affects the alignment of the scanner with the tape.

The scanner 10 is positioned at a recording location so that the planar end face 14 of the drum 12 faces a tape on which a sequence of arcuate tracks is to be written or read. The end face 14 is adjusted with respect to the edges of the tape by pivoting the housing 24, and with it the drum 12, about a pivot axis 32. The tape moves past the end face 14 in a direction indicated by arrow 42 and the drum 12 rotates in the direction of arrow 44.

A tilt motor controls the angular tilting of the scanner 10 with respect to the tape. The tilt motor includes a stationary bracket 34 that carries on its rear portion a conventional voice coil 36 with an open center. A U-shaped bracket 38 is affixed to the rear end of the motor/bearing housing 24 by another U-shaped bracket (not illustrated). The U-shaped bracket 38 has one leg which is received in the center of the voice coil 36 and another leg to which a permanent magnet 40 is attached. Current through the voice coil 36 sets up a magnetic field in its open center which is conducted in the U-shaped bracket 36 to the permanent magnet 40. An electromotive force is exerted on the U-shape bracket 36 and its attached magnet 40 having a magnitude determined by the magnitude of the field induced in the coil 36. The scanner 10 pivots above the pivot axis 32 by an angular amount that depends upon the relative strengths of the voice coil 36 field and the field of the permanent magnet 40, thereby selectively positioning the axis of rotation on which the shaft 20 and drum 12 rotate.

Alternative embodiments of the present invention provide other tilt mechanisms, such as a servo motor, or oppositely directed magnetic coils, as appreciated by one of ordinary skill in the art. The present invention is not limited to controlling the tilting of the scanner to control the pointing of the scanner at the recording tape. Other embodiments of the invention provide other methods of controlling the pointing position of the scanner head relative to the tape. These include controlling the elevation of the scanner with an elevator mechanism, or providing a side swing mechanism for the scanner, as one of ordinary skill in the art will appreciate.

FIG. 2 is a view through a tape at the reading location towards the planar end face of the ASHA scanner drum. As shown, there are eight transducers mounted with their active surfaces extending slightly through a plane at the end face of the drum. Four transducers are designated as write transducers and are identified as $W_0$, $W_1$, $W_2$ and $W_3$. In addition, there are four read transducers identified as $R_0$, $R_1$, $R_2$ and $R_3$. Identical subscripts identify write/read transducer pairs in which the track written by transducer $W_1$ is later read by transducer $R_1$. Further, the write transducers are accurately spaced on the drum by 90° in the order in which they write tracks on the tape, which is $W_0$, $W_1$, $W_2$ and $W_3$. similarly, the read transducers are spaced from each other by 90°, but are spaced from adjacent write transducers by 45°. Further, read transducer $R_1$ is displaced by 135° in the direction opposite the scanner rotation direction from write transducer $W_1$.

The sequence traced across the tape from edge to edge when the scanner rotates in the direction indicated in FIG. 2 is: $W_0$, $R_3$, $W_1$, $R_0$, $W_2$, $R_1$, $W_3$, $R_2$. Write heads $W_0$ and $W_2$ are oriented to write at a first azimuth angle on the tape, and read heads $R_0$ and $R_2$ read information recorded at the first azimuth angle. Write heads $W_1$ and $W_3$ are oriented to write at a second azimuth angle on the tape, and read heads $R_1$ and $R_3$ read information recorded at the second azimuth angle. As thus described, when the tape speed is matched to an appropriate rotational velocity of the drum, the write transducers, when energized, will trace a sequence of contiguous recorded arcuate tracks with alternating azimuthal orientation. Similarly, the read heads sense recorded information from a sequence of arcuate tracks with alternating azimuthal orientation.

FIG. 3 shows the preferred format of the information on the developed tape in somewhat simplified form, as viewed through the tape looking towards the end face of the ASHA scanner drum in FIG. 2. It should also be noted that the various regions on the tape are not drawn to scale.

As shown in FIG. 3, the 'TRIBO' interface standard specifies a region along the top edge T of the tape as a guard band. A similar guard band extends along the lower edge L of the tape. The top guard band typically is 15 mils wide, and the lower guard band typically is 10 mils wide. Each TRIBO guard band extends for the full length of the tape. The arcuate scanner type data recording system will not write data in the guard bands.

Along the inner edge of each guard band is a magnetic stripe, designated an LS1 stripe. The manufacturer deeply records the LS1 stripes along the entire length of the tape. The present invention utilizes the lower LS1 stripe as a reference point. The upper LS1 stripe is not strictly necessary for the present invention, but its inclusion is preferred.

The recorded sections of the tape are spaced from the upper and lower guard bands and LS1 stripes by a specified distance, e.g. 1.0 mils.

The actual data tracks are bounded by a top servo region and a lower servo region. Within these regions bursts A and B of servo frequency signals are recorded at predetermined locations. During the writing operation, the scanner writes predetermined amounts of erase signals before and after the respective servo bursts. During a subsequent read operation, a predetermined read head partially overlaps data tracks in such a manner that it detects differing predetermined amounts of the A and B servo bursts during different time windows. The scanner system uses comparisons of the detected amplitudes of the various A and B servo bursts as a servo control, e.g. for servo control of tape speed and/or ASHA tilt angle.

In accord with the present invention, all timing and orientation functions for servo control, data read commutation, and data write sampling are based on detection of the lower LS1 stripe and various known positional relationships between the ASHA components.

The recorded information on the tape forms arcs. A straight line across an arc, extending from one end to the other, forms a chord. For a tape of a given width having known guard bands and predetermined spacing from the edges of the guard bands, the chord length becomes a known value. For example, for common quarter inch magnetic recording tape, the tape is typically about 247 mils wide. The top guard band is 15 mils, the lower guard band is 10 mils, the desired spacing from the top guard band is 1 mil, and the desired spacing from the lower guard band is 1 mil. The chord length therefore should be about 220 mils.

During both reading and writing to the tape, it is critical to maintain alignment of the center of the ASHA with the center of the information recording area, shown as center line C in FIG. 3. This center line C passes through the center of the chord length of each recorded arc. Because of the differences in the guard band dimension, the center line C does not coincide with the physical center line of the tape. In the above example, the chord length is 220 mils. The center of the chord is 110 mils from either end of the arc, or approximately 111 mils above the lower LS1 stripe.

Figure 4:
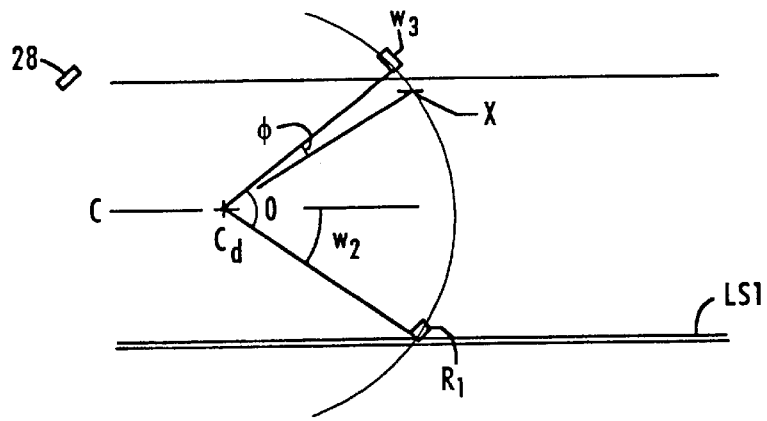
FIG. 4 is a simplified diagram of the format and the geometric relationship thereof to a read head and a write head.

With reference to FIG. 4, the center of rotation $C_d$ of the ASHA is aligned with the centerline C of the information region of the tape. The angles between the various read and write heads are known and the position thereof can be calculated in relation to the index sensor 28. In accord with the present invention, each write head is activated a predetermined period $T_o$ after a read head bearing a known angular relationship to the write head crosses the lower LS1 stripe.

Assuming the head arrangement illustrated in FIG. 2, the read head $R_1$ crosses the tape followed by the write head $W_3$. The crossing of the read head $R_1$ over the LS1 stripe along the lower guard band produces a pulse output from that head. The write head $W_3$ is offset by a known angle $\theta$ from the read head $R_1$, for example by approximately 45° in the ASHA embodiment illustrated in FIG. 2. This angle will vary slightly from one head assembly to another, but for a particular head assembly, this angle will remain constant for the entire useful life of the head assembly.

From the radius of rotation of the head and the chord length of the desired information recording arc, it is possible to calculate the angle $\Phi$ that the write head $W_3$ must travel through before reaching the desired top of the information arc (see FIG. 3). The rotational speed of the ASHA also is known, therefore, a microcontroller can calculate a transit delay $T_o$ required for the write head $W_3$ to travel from the position shown in FIG. 4 (when the read head $R_1$ crosses the lower LS1 stripe) until the write head $W_3$ reaches the point X on the tape at which that head should begin a writing operation. The microcontroller therefore activates the write head $W_3$ after a delay of $T_o$ following the detection of the lower LS1 stripe by the read head $R_1$.

Figure 5:
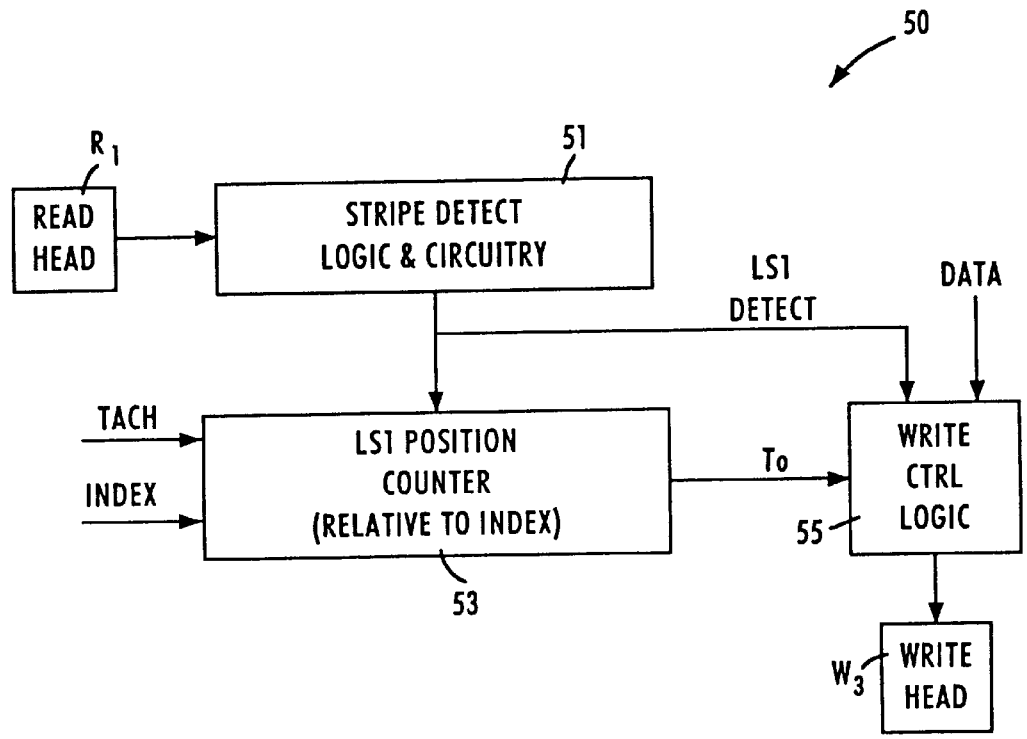
FIG. 5 is a functional/logic diagram of the control of a write operation in accord with a first aspect of the invention.

FIG. 5 is a simplified functional block diagram of the control loop 50 for controlling the write head commutation. For simplicity of discussion, only one read head and only one write head are shown, but it will be readily apparent that similar processing occurs during a write operation for the other heads on the ASHA. As shown, the read head $R_1$ supplies a detection signal to stripe detection logic and filter circuitry 51. The stripe detection logic and circuitry 51 produces a pulse signal in response to the passage of the read head $R_1$ over the magnetized lower LS1 stripe. If two similar LS1 stripes are provided on the tape, e.g. upper and lower stripes as in FIG. 3, then the logic and circuitry 51 will differentiate between the two, for example based on a timing or sequence analysis.

The stripe detection logic and circuitry 51 supplies the LS1 detection pulse signal to a microcontroller (not shown in detail). Within the microcontroller, a microcode process is running to count position pulses relative to index to identify the LS1 position relative to the index. This microcode routine appears at reference numeral 53 in FIG. 5. The stripe detection logic and circuitry 51 supplies the LS1 detection pulse signal to the position counter routine 53, and the routine 53 calculates a delay time $T_o$ for the transit of the next write head $W_3$ to the point X for the start of its write operation, as outlined above relative to FIG. 4. The LS1 position counter routine 53 produces a clock count value representing the number of clock pulses equal to the necessary time delay $T_o$.

The stripe detection logic and circuitry 51 also supplies the LS1 detection pulse signal to write control logic 53. The write control logic 55 may be a separate circuit or another microcode routine running on the microcontroller. Also, the LS1 position counter routine 53 supplies the clock count value representing the number of clock pulses equal to the necessary time delay $T_o$ to the write control logic 55. The write control logic 55 counts the specified number of clock pulses equal to the necessary time delay $T_o$ following the LS1 detection pulse, and at that time, activates the write head $W_3$ to initiate its write operation.

The microcontroller also provides servo signals, erase signals and data to the write head to write data on the tape in the sequence required to achieve the format shown in FIG. 3. All of the write sequence operations are referenced back to the pulse detected when the read head $R_1$ crossed over the lower LS1 stripe.

The interpretation of read head signals is similarly timed in relation to the LS1 stripe detection. Since the angle between read heads is known (FIG. 2), the signal processing circuity is activated to begin sampling and interpreting signals from the next read head when that read head reaches the appropriate position X over the tape. The control functionality is virtually identical to that used to activate the operation of the write head $W_3$ discussed above. In a read operation, various timing windows are defined by the microcode of the microcontroller. These windows for each read head are referenced to an earlier crossing of a read head over the lower LS1 stripe.

For example, the servo burst $A_T$ is written in a particular section of the tape, and bounded by specified amounts of erase signal (E). The third read head $R_3$ is located at an angle of 90° with regard to the second read head $R_2$. During a read operation, the circuitry responsive to the signals from the third read head $R_3$ are time indexed to the pulse signal indicating the passage of head $R_2$ over the lower LS1 stripe. In the example, a time window is defined with reference to that LS1 crossing when the circuitry will sample for the $A_T$ servo burst. Similar time windows are defined for detecting the second top servo burst $B_T$, the bottom server bursts $A_B$, $B_B$ and various format timing blocks within the data tracks.

As shown by the above discussion of the present invention, all critical timing of the write and read operations are referenced to the lower LS1 stripe. The processes of writing the LS1 stripes on the tape, however, are subject to imperfections. A manufacturer executes a single run or pull of the tape longitudinally past heads to write the LS1 stripes on the tape. Other regions of the tape remain blank until written thereon by an arcuate scanner. The tape may wander during the LS1 stripe writing operation, the tape width may vary slightly, the tape may vibrate, the tape may stretch laterally, etc. As a result, the lower LS1 stripe may wander somewhat over the length of the tape.

Figure 6:
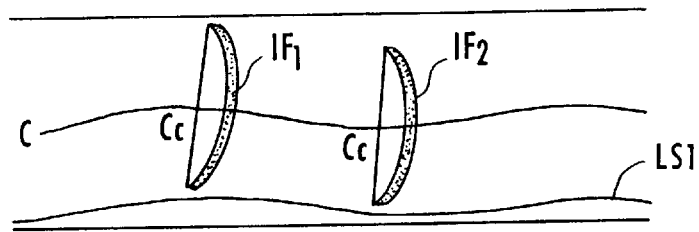
FIG. 6 is an exaggerated representation of vertical variations in track placement.

In accord with a second aspect of the present invention, the tilt angle of the ASHA is also referenced to the lower LS1 stripe. As the LS1 stripe wanders, the write operation referenced to that stripe will also wander. FIG. 6 provides a somewhat exaggerated representation of a developed tape showing the wander of the lower LS1 stripe and the corresponding variations in placement of the formatted information. As shown, at locations where the lower LS1 strip is slightly higher in relation to the bottom edge of the tape, the write head will place the written format information $IF_1$ at a correspondingly higher position on the tape. At such locations, the chord center $C_c$ is higher. At locations where the lower LS1 strip is slightly lower in relation to the bottom edge of the tape, the write head will place the written format information $IF_2$ at a correspondingly lower position on the tape. At such locations, the chord center $C_c$ is lower. The line formed by the centers of the arcs (C in FIG. 3) is no longer straight, instead the center line wanders in the same manner as the lower LS1 stripe. At any given point, however, the distance from LS1 to the center line C remains approximately constant.

Figure 7:
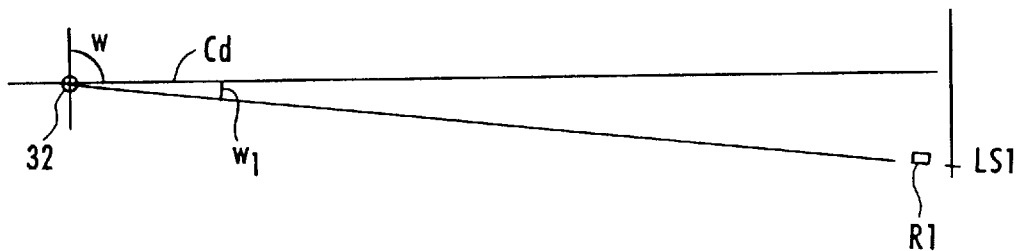
FIG. 7 provides a simplified illustration of the geometrical relationship of the arcuate scanner head assembly to the tape format from a side view, helpful in explaining another aspect of the invention.

Based on reference to the LS1 stripe, the axis of rotation of the ASHA $C_d$ is kept in alignment with the center line C formed by the arc centers, to compensate for drift of the lower LS1 stripe. FIG. 7 provides a lateral view of the relevant geometry. The ASHA is effectively aimed by adjusting the tilt angle ω about the axis 32, as discussed above relative to FIG. 1. The tilt angle is servo controlled in response to detection of the lower LS1 stripe by one of the read heads, such as read head $R_1$. In the lateral direction, the tilt angle ω is adjusted in response to detection of the lower LS1 stripe to keep the angle $\omega_1$ of the read head from the axis $C_d$ constant.

FIG. 4 can be referenced to explain how this operation works. For a given arc length or chord length, the angle $\omega_2$ between the center of rotation $C_d$ and the point at which a specific read head, e.g. $R_1$, crosses the lower LS1 stripe is a known constant.

The intent is to align the center of rotation $C_d$ of the ASHA with the center of the information arc (i.e. at a particular point on the wandering center line C). The relationship of the lower LS1 stripe to the information arc is known. Assuming the centers are aligned at $C_d$ in FIG. 4, then the angle $\omega_2$ represents the angle of head rotation from the center of the information arc to the crossing of LS1. Typically this angle corresponds to one half the arc angle plus some small amount for the spacing between the arc and the lower LS1 stripe. In accord with the present invention, variations in the angle $\omega_2$ (e.g. measured with reference to the index 28) are used to produce an error signal to adjust the tilt angle ω to maintain the desired alignment.

Figure 8:
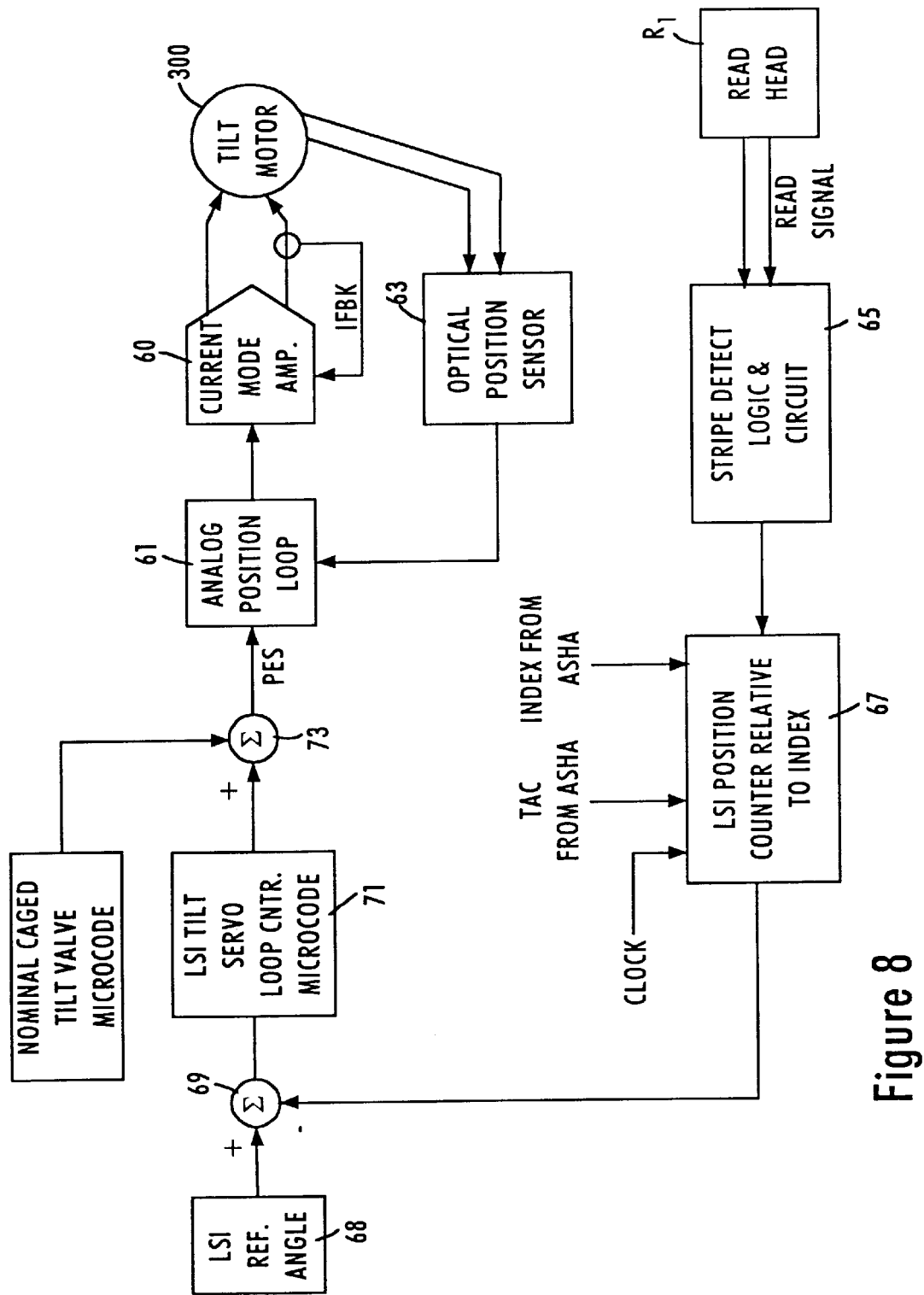
FIG. 8 is a functional/logic diagram of the control of a write operation in accord with another aspect of the invention.

FIG. 8 is a simplified functional block diagram of the control loop for controlling the tilt angle. For simplicity of discussion, this drawing shows only one read head, but it will be readily apparent that similar processing occurs with respect to other heads on the ASHA.

The ASHA 10 has a tilt motor 300, for example, comprising the elements 34, 36, 38 and 40 of FIG. 1. The tilt motor 300 responds to signals from a current mode amplifier to adjust the tilt angle of the ASHA 10. An analog position loop 61 provides a control current signal to the current mode amplifier 60. An optical position sensor 63 detects the actual position of the ASHA produced by the tilt motor 300 and supplies a position sensor signal to the analog position loop 61. The analog position loop 61 also is responsive to a position error signal (PES) produced in accord with the second aspect of the present invention. More specifically, the position error signal represents an error in the angle $\omega_2$ shown in FIG. 4.

The tilt control of the present invention operates during both read and write operations to maintain proper alignment. Consider first a write operation.

In operation, one of the read heads crosses the lower LS1 stripe, e.g. read head $R_1$. The read head $R_1$ supplies signals to stripe detection logic and associated circuitry 65. The stripe detection logic and circuitry 65 produces a pulse signal in response to the passage of the read head $R_1$ over the magnetized lower LS1 stripe. If two similar LS1 stripes are provided on the tape, e.g. upper and lower stripes as in FIG. 3, then the logic and circuitry 65 will differentiate between the two, for example based on a timing or sequence analysis.

The stripe detection logic and circuitry 65 supplies the LS1 pulse signal to a microcontroller (not shown in detail). Within the microcontroller, a microcode process is running to count position pulses relative to index 28 to identify the LS1 position relative to the index. This microcode routine appears at 67 in FIG. 8 and is similar to the routine 53 discussed above with regard to FIG. 5. The LS1 position routine 67 receives the LS1 detection pulse, the tachometer (revolutions per minute) reading from the sensor 30, the ASHA index position from the sensor 28 (one per revolution) and a clock signal. From that information, the LS1 position routine 67 produces coarse and fine count values for the position of the LS1 crossing relative to the index.

The count values for the current position are applied to the negative input of a summation circuit 69. The summation circuit 69 also receives coarse and fine values for a reference angle 68 for the LS1 crossing relative to the index.

The summation circuit produces a difference or error signal representing the difference between the measured LS1 position relative to index and the reference LS1 position relative to index. The summation circuit 69 supplies this error signal to another microcode routine 71 of the microcontroller. This routine is the LS1 tilt servo loop control microcode.

The microcode routine 71 produces an analog position error signal (D/A converter not shown) which is summed with a reference analog position signal in a second summation circuit 73. The result of this summation goes to the analog position loop 61 as the position error signal (PES). As the LS1 stripe moves up and down during the writing operation, the loop control of FIG. 8 adjusts the current applied to the tilt motor 300 to keep the LS1 angle $\omega_2$ constant as measured with respect to the angular rotation index of the ASHA.

If all of the tracks are written using the closed loop control of FIG. 8, then the tracks all end a specified distance (e.g. 1 mil) above the lower LS1 stripe. The same loop operates to control the tilt angle during the reading operation. In the reading operation, the tilt tracking loop can also be fine tuned to exit and enter tracks at the center of the tracks. For this purpose, the LS1 tilt servo is modulated based on a servo loop detection of the A and B servo pulses.

Although shown and explained separately, for ease of understanding, in actual operation the head commutation timing and the tilt angle control described above occur as part of the ongoing control operations of the ASHA during each and every read cycle and write cycle executed through the ASHA. As such, the activation of the write heads, the interpretation of the read head outputs and the tilt angle alignment of the ASHA with respect to the center of each data arc all are referenced to a common point on the tape, the crossing point of a read head over the lower LS1 stripe.

Figure 9:
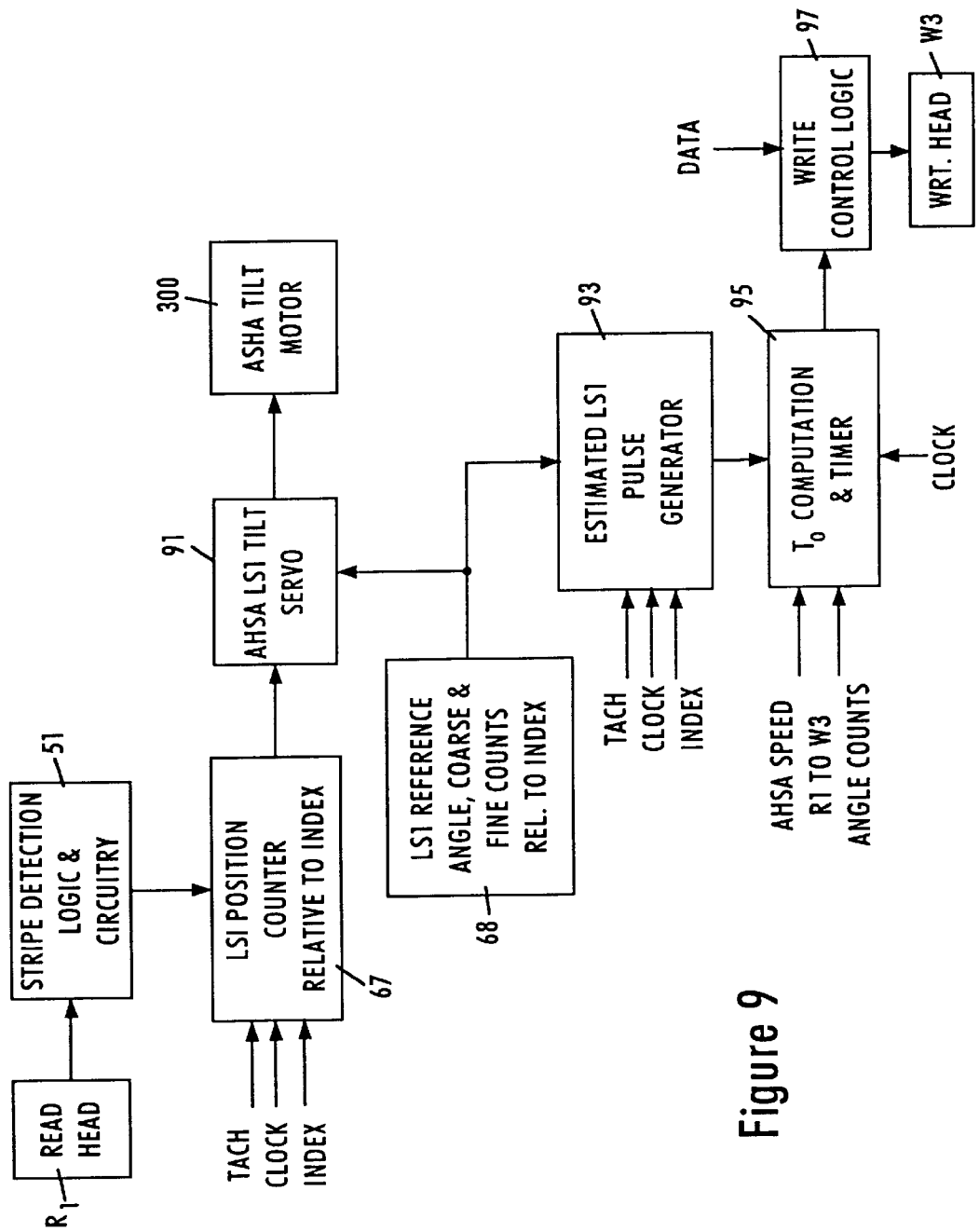
FIG. 9 is a functional/logic diagram of an exemplary embodiment of the tilt angle control and write commutation control in accord with the present invention.

FIG. 9 depicts the most exemplary embodiment of the control circuitry in accord with the present invention. The embodiment of FIG. 9 differs from that of FIGS. 5 and 8 in that it provides both tilt angle control and write commutation control in one circuit. Also, the control circuit of FIG. 9 references the commutation functions to an estimated lower LS1 detection event, rather than directly to an actual lower LS1 detection. occasionally, the detection circuitry will miss the lower LS1 stripe detection. The tilt angle control elements will maintain the tilt angle at the last value for that angle. The lower LS1 estimation will still provide the necessary commutation timing reference. A more detailed discussion of this embodiment follows.

Several of the components shown in FIG. 9 are the same as components appearing in the earlier drawings, and those elements are indexed by the same reference numerals used in the earlier drawings.

FIG. 10 illustrates the timing of events and signals during control in accord with FIG. 9, and the following description will refer to both FIG. 9 and FIG. 10. In FIG. 10 the processing logically begins with an S1 signal indicating detection of the index. The second line H in FIG. 10 shows the times during which the various heads pass the tape.

As in the earlier embodiment, the read head $R_1$ supplies a detection signal to stripe detection logic and filter circuitry 51. Passage of the head over the lower LS1 stripe produces an analog pulse waveform as shown at S2 in FIG. 2. The stripe detection logic and circuitry 51 converts that analog impulse into a digital level type pulse signal (S3). As shown, the timing of the pulse signal (S3) coincides with the passage of the read head $R_1$ over the magnetized lower LS1 stripe.

With reference to FIG. 9, the stripe detection logic and circuitry 51 supplies the lower LS1 detection pulse signal to a microcontroller (not shown in detail). Within the microcontroller, a microcode process 67 is running to count position pulses relative to index 28 to identify the lower LS1 position relative to the index. The LS1 position routine 67 receives the lower LS1 detection pulse, the tachometer (revolutions per minute) reading from the sensor 30, the ASHA index position from the sensor 28 (one per revolution) and a clock signal. From that information, the LS1 position routine 67 produces coarse and fine count values for the position of the lower LS1 crossing relative to the index.

In the embodiment of FIG. 9, the coarse and fine count values for the position of the lower LS1 crossing relative to the index and the coarse and fine count values for the LS1 reference position 68 go to an ASHA LS1 tilt servo circuit 91. The circuit 91 controls the tilt motor 300 and generally comprises the elements shown in FIG. 8 not reproduced in FIG. 9, e.g. the summation circuit 69, the loop control 71, the summation circuit 73, the nominal caged tilt value microcode, the position loop 61, the amplifier 60 and the position sensor 63. The ASHA LS1 tilt servo circuit 91 controls the tilt motor 300 to maintain a constant rotational angle of the head R1 with respect to crossing of the lower LS1 stripe, when measured relative to the index, in the same manner as discussed above in detail relative to the embodiment of FIG. 8.

The coarse and fine count values for the LS1 reference position 68 also go to a pulse signal generator 93. The generator 93 generates a pulse at a time after index estimated to coincide with crossing of the lower LS1 stripe by the read head $R_1$, as shown at S4 in FIG. 10. If the tilt angle is controlled as discussed above to keep the rotational reference angle constant, then the estimated lower LS1 pulse (S4) should coincide with the actual lower LS1 detection pulse (S3), as shown by comparison of those signals in FIG. 10.

However, the pulse output by the generator 93 is not dependent directly on actual lower LS1 stripe detection. If the system misses the lower LS1 stripe for a cycle or two, for some reason, the pulse generator 93 continues to output the pulse at the appropriate time after the index signal; and the write control logic 55 continues to activate the write heads to write the various forms of information on the recording tape.

The estimated LS1 pulse generator 93 outputs the pulse (S4) to a timer circuit 95. The timer circuit 95 receives an ASHA speed or tachometer signal (revolutions per minute) and the clock signal. The timer circuit 95 also receives an angle count ($R_1$ to $W_3$) representing the transit time $T_o$ for the head $W_3$ to travel from its position when the head $R_1$ crosses the lower LS1 stripe to the position at which that write head should begin writing. The timer circuit 95 receives the angle count value from an appropriate microcode routine running in the microcontroller. This routine may be responsive to actual lower LS1 crossing detections, as in the earlier embodiment. The timer 95, however, utilizes the last To count value it received. Therefore the operation of the timer 95 is not interrupted by a temporary loss of detection of the lower LS1 stripe crossing.

The write control logic 97 passes data and other signals to the write head in response to the pulse signal (SS) from the timer circuit 95. Line S6 in FIG. 10 shows the write interval initiated by the pulse S5. At the end of a write operation interval, the logic circuit 97 terminates the write operation, as shown by the pulse signal S7 in FIG. 10.

As in the earlier embodiments, the various sequencing operations within one write cycle, e.g. to write servo signals, data, etc., also are controlled in reference to the lower LS1 stripe. In this embodiment, however, the tilt angle is controlled directly in response to the lower LS1 stripe detection to maintain a constant reference angle between the index and the point of rotation of the read head to detect that stripe. When that angle is constant, the LS1 detection coincides with the estimated LS1 pulse. The actual timing functions within the write sequence, however, are controlled in response to the estimated LS1 detection pulse. The timing functions relevant to read operations can be controlled in a similar manner.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A method of processing information on a recording tape, comprising the steps of;

rotating an arcuate scanner head assembly about an assembly axis, said arcuate scanner head assembly comprising a first head and a second head radially mounted on the assembly with a predetermined angle between the first head and the second head, said first head being a read head;

moving the recording tape longitudinally and across the assembly axis, the recording tape having a readable stripe extending along the length of the recording tape at a predetermined lateral position on the recording tape;

in response to a signal from the first head, detecting passage of the first head across the readable stripe;

calculating a transit delay time of the second head from its angular position when the first head crosses the readable stripe to a predetermined position in relation to the tape; and activating an operation for processing information on an arcuate track of the tape through the second head after expiration of the delay time.

2. A method as in claim 1, wherein the step of activating an operation comprises initiating an operation to write a predetermined type of information to the recording tape through the second head.

3. A method as in claim 1, wherein the step of activating an operation comprises initiating sampling of signals produced by the second head as it passes over information written on the recording tape.

4. A method as in claim 3, wherein the sampling comprises sampling signals to capture information of a predetermined type.

5. A method as in claim 1, wherein the step of activating comprises initiating an operation with regard to the second head after expiration of the delay time following the detection of passage of the first head across the readable stripe.

6. A method as in claim 1, further comprising:

determining an angular relationship of the first head with respect to a rotational index when the first head passes across the readable stripe; and adjusting a directional alignment of the arcuate scanner head assembly with regard to an information recording region on the recording tape to maintain a predetermined directional alignment, in response to the determined angular relationship of the first head with respect to the rotational index.

7. A method as in claim 6, wherein the step of activating comprises:

estimating when the first head passes across the readable stripe; and initiating an operation with regard to the second head after expiration of the delay time following the estimated passage of the read head across the readable stripe.

8. A method of processing information on a recording tape, comprising the steps of;

rotating an arcuate scanner head assembly about an assembly axis, said arcuate scanner head assembly comprising a first head and a second head radially mounted on the assembly with a predetermined angle between the first head and the second head, said first head being a read head;

moving the recording tape longitudinally and across the assembly axis, the recording tape having a readable stripe extending along the length of the recording tape at a predetermined lateral position on the recording tape;

in response to a signal from the first head, detecting passage of the first head across the readable stripe;

determining an angular relationship of the first head with respect to a rotational index when the first head crosses the readable stripe to a predetermined position in relation to the tape;

adjusting a directional alignment of the arcuate scanner head assembly with regard to an information recording region on the recording tape, in response to the angular relationship of the first head with respect to the rotational index;

calculating a transit delay time of the second head from its angular position when the first head crosses the readable stripe to a predetermined position in relation to the tape; and activating an operation for processing information on an arcuate track of the tape through the second head after expiration of the delay time.

9. A method as in claim 8, wherein the step of adjusting comprises adjusting a tilt angle of the arcuate scanner head assembly.

10. A method as in claim 8, wherein the activating step comprises activating a write operation through the second head.

11. A method as in claim 8, wherein the activating step comprises initiating reading recorded information from the recording tape.

12. A method as in claim 8, wherein the step of activating comprises initiating an operation with regard to the second head after expiration of the delay time following the detection of passage of the first head across the readable stripe.

13. A method as in claim 8, wherein the step of activating comprises:

estimating when the first head passes across the readable stripe; and initiating an operation with regard to the second head after expiration of the delay time following the estimated passage of the first head across the readable stripe.

14. An accurate scanning system, comprising:

an arcuate scanner having a plurality of scanner heads, the arcuate scanner performing read and write operations on the recording tape;

a circuit responsive to read signals from a first one of the heads for detecting passage of the one head over a readable stripe on the recording tape;

an index sensor located in proximity to the arcuate scanner for generating an index signal when the arcuate scanner passes an index point;

a circuit responsive to detection of the first head over the readable stripe and the index signal for determining an angular position of the first head with respect to the index point;

a tilt angle control motor coupled to the arcuate scanner to selectively tilt the arcuate scanner; and a circuit responsive to the angular position of the first head for controlling the tilt angle control motor in response to the angular relationship of the first head with respect to the index point; and a circuit responsive to the angular position of the first head for activating an operation for processing information on an arcuate track of the tape through a second one of the heads after expiration of a predetermined delay time following passage of the first head across the readable stripe.

* * * * *